United States Patent
Kikuchi et al.

(10) Patent No.: US 12,547,280 B2
(45) Date of Patent: Feb. 10, 2026

(54) ACTIVE MATRIX SUBSTRATE, DISPLAY PANEL WITH TOUCH SENSOR FUNCTION, AND METHOD OF MANUFACTURING ACTIVE MATRIX SUBSTRATE

(71) Applicant: Sharp Display Technology Corporation, Kameyama (JP)

(72) Inventors: Tetsuo Kikuchi, Kameyama (JP); Tohru Daitoh, Kameyama (JP); Setsuji Nishimiya, Kameyama (JP); Hitoshi Takahata, Kameyama (JP); Teruyuki Ueda, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/584,124

(22) Filed: Feb. 22, 2024

(65) Prior Publication Data

US 2024/0329782 A1    Oct. 3, 2024

(30) Foreign Application Priority Data

Mar. 29, 2023 (JP) ................. 2023-053214

(51) Int. Cl.
| | |
|---|---|
| *G06F 3/044* | (2006.01) |
| *G02F 1/1362* | (2006.01) |
| *G02F 1/1368* | (2006.01) |
| *G06F 3/041* | (2006.01) |

(52) U.S. Cl.
CPC ........ *G06F 3/044* (2013.01); *G02F 1/136227* (2013.01); *G02F 1/1368* (2013.01); *G06F 3/04164* (2019.05)

(58) Field of Classification Search
CPC ................. G06F 3/044; G06F 3/04164; G06F 2203/04103; G06F 3/0412; G06F 3/0443; G02F 1/136227; G02F 1/1368; G02F 1/13338; G02F 1/134372
See application file for complete search history.

(56) References Cited

U.S. PATENT DOCUMENTS

| | | | |
|---|---|---|---|
| 11,614,662 B1 * | 3/2023 | Kim | ................. G02F 1/133357 345/173 |
| 2021/0011570 A1 * | 1/2021 | Luo | ....................... G06F 3/0416 |
| 2022/0342246 A1 * | 10/2022 | Hara | ................. G02F 1/136286 |
| 2024/0222397 A1 * | 7/2024 | Chung | ................. H10D 86/451 |
| 2024/0331641 A1 * | 10/2024 | Kozuma | ............ G06V 40/1318 |

FOREIGN PATENT DOCUMENTS

JP    2022-167632 A    11/2022

* cited by examiner

*Primary Examiner* — Amit Chatly
(74) *Attorney, Agent, or Firm* — ScienBiziP, P.C.

(57) ABSTRACT

An active matrix substrate is to be mounted on a display panel with a touch sensor function. The active matrix substrate includes a first layer provided with a touch sensor line, a second layer being above the touch sensor line and being provided with a pixel electrode, and a common electrode as a third layer formed between the first layer and the second layer. The common electrode functions as a touch sensor electrode by being connected to the touch sensor line and also functions as a counter electrode of the pixel electrode. The active matrix substrate further includes a first insulating layer formed between the first layer and the third layer, and a second insulating layer formed between the second layer and the third layer. The first insulating layer is formed of an organic resin film.

8 Claims, 11 Drawing Sheets

ACTIVE MATRIX SUBSTRATE, DISPLAY PANEL WITH TOUCH SENSOR FUNCTION, AND METHOD OF MANUFACTURING ACTIVE MATRIX SUBSTRATE

CROSS-REFERENCE TO RELATED APPLICATIONS

This application claims the benefit of priority to Japanese Patent Application Number 2023-053214 filed on Mar. 29, 2023. The entire contents of the above-identified application are hereby incorporated by reference.

BACKGROUND

Technical Field

The disclosure relates to an active matrix substrate, a display panel with a touch sensor function, and a method of manufacturing the active matrix substrate.

There have been known a display panel with a full in-cell touch sensor function, using an active matrix substrate, and a method of manufacturing the active matrix substrate. For example, JP 2022-167632 A discloses an active matrix substrate capable of suppressing a decrease in pixel aperture ratio or a reduction in auxiliary capacitance.

SUMMARY

In such a display panel, improvement in performance of the touch sensor is required, and improvement in display quality is also required. While such high functionality is required, cost reduction is also required.

According to a certain embodiment, an active matrix substrate is an active matrix substrate to be mounted on a display panel with a touch sensor function. The active matrix substrate includes a first layer provided with a touch sensor line; a second layer above the touch sensor line, the second layer being provided with a pixel electrode; a third layer between the first layer and the second layer, the third layer being provided with a common electrode functioning as a counter electrode of the pixel electrode and functioning as a touch sensor electrode by being connected to the touch sensor line; a first insulating layer formed between the first layer and the third layer; and a second insulating layer formed between the second layer and the third layer. The first insulating layer is formed of an organic resin film.

Further details will be described in the embodiments below.

BRIEF DESCRIPTION OF DRAWINGS

The disclosure will be described with reference to the accompanying drawings, wherein like numbers reference like elements.

DESCRIPTION OF EMBODIMENTS

Description of Display Device

Figure 1:
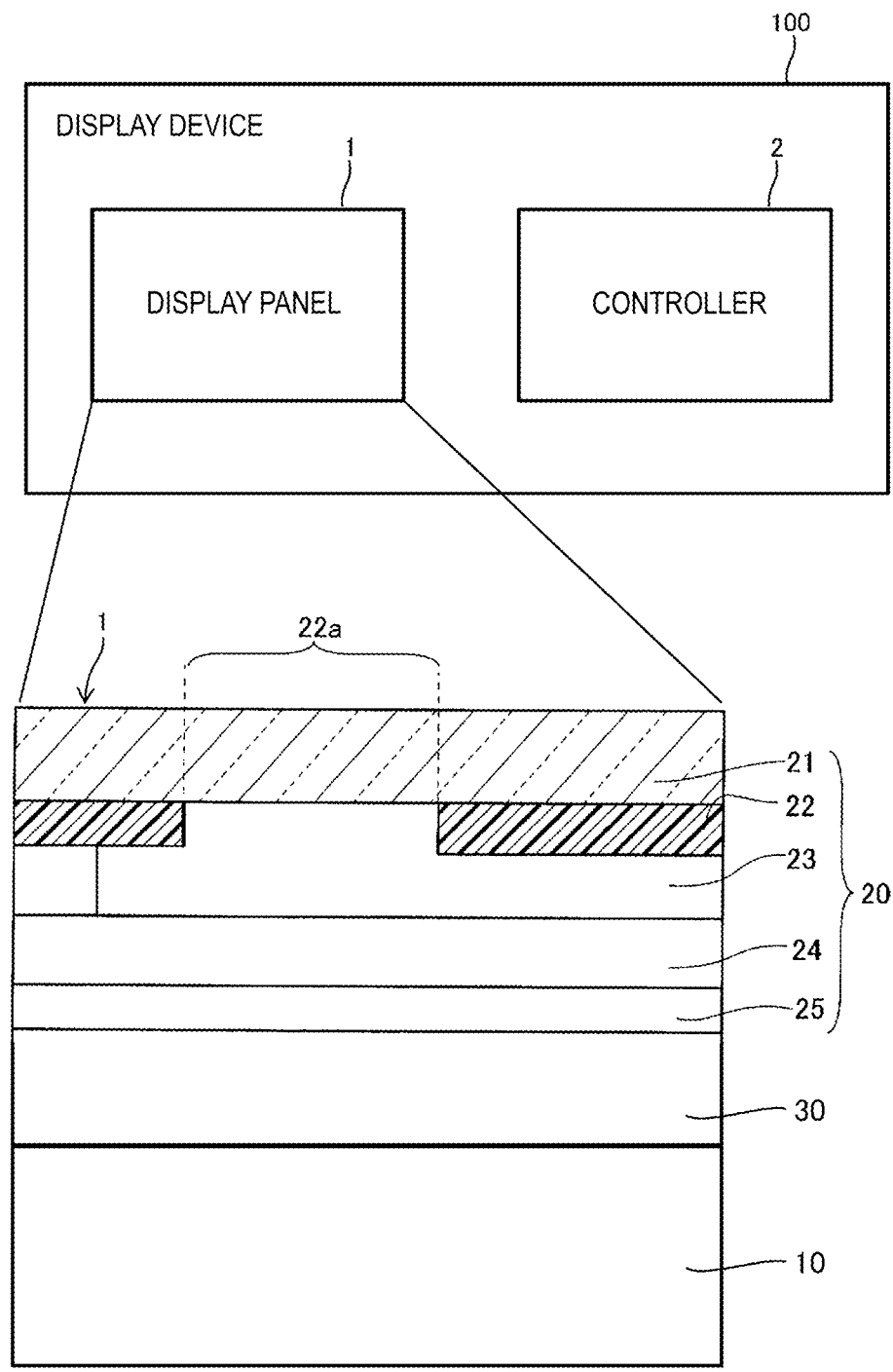
FIG. 1 is a diagram schematically illustrating a configuration of a display device according to an embodiment.

FIG. 1 is a diagram schematically illustrating a configuration of a display device 100 according to the present embodiment. The display device 100 includes a display panel 1 with a touch sensor function (hereinafter referred to as "display panel 1") and a controller 2.

Description of Display Panel

The display panel 1 is a full in-cell touch panel. The display panel 1 has a function of displaying a video or an image, and a function of detecting a touch and a touch position from a pointer. The controller 2 executes each control process in the display device 100 on the basis of the touch position acquired from the display panel 1.

The display panel 1 includes an active matrix substrate 10, a counter substrate 20 placed facing the active matrix substrate 10 with a liquid crystal layer interposed therebetween, and a liquid crystal layer 30 interposed between the active matrix substrate 10 and the counter substrate 20. The liquid crystal layer 30 is placed above the active matrix substrate 10. The counter substrate 20 is disposed facing the active matrix substrate 10 with the liquid crystal layer 30 interposed therebetween. A user visually recognizes an image from a front surface (hereinafter, touch surface) side of the counter substrate 20. The display panel 1 receives a touch operation by, for example, a finger (pointer) on the touch surface.

A glass substrate 21, a black matrix 22, a color filter 23, a transparent fixed layer 24, and an alignment film 25 are disposed in the counter substrate 20 in this order from the touch surface side. The black matrix 22 includes an opening 22a. The opening 22a functions as a light-transmitting portion that transmits light from the liquid crystal layer 30 side to the touch surface side.

First Embodiment

Description of Active Matrix Substrate

Figure 2:
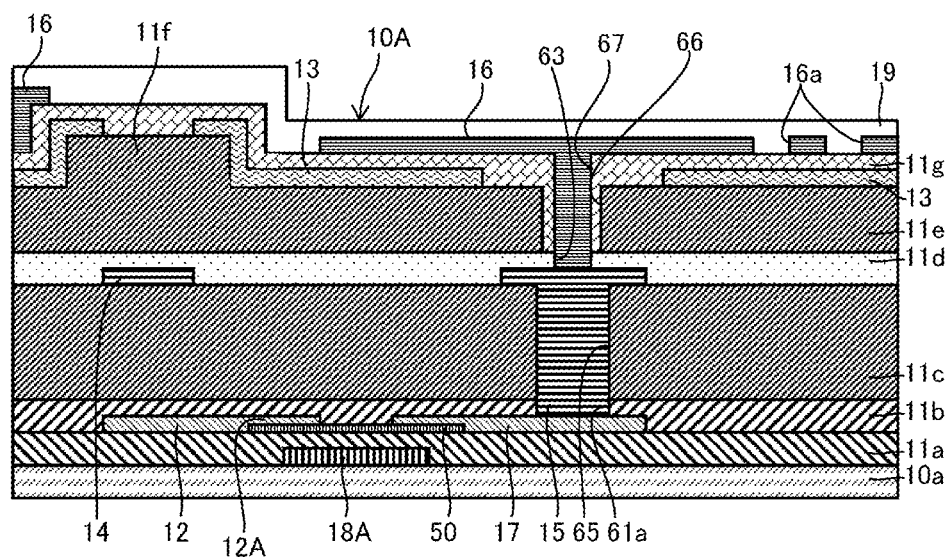
FIG. 2 is a schematic cross-sectional view of an active matrix substrate according to a first embodiment.
Figure 3:
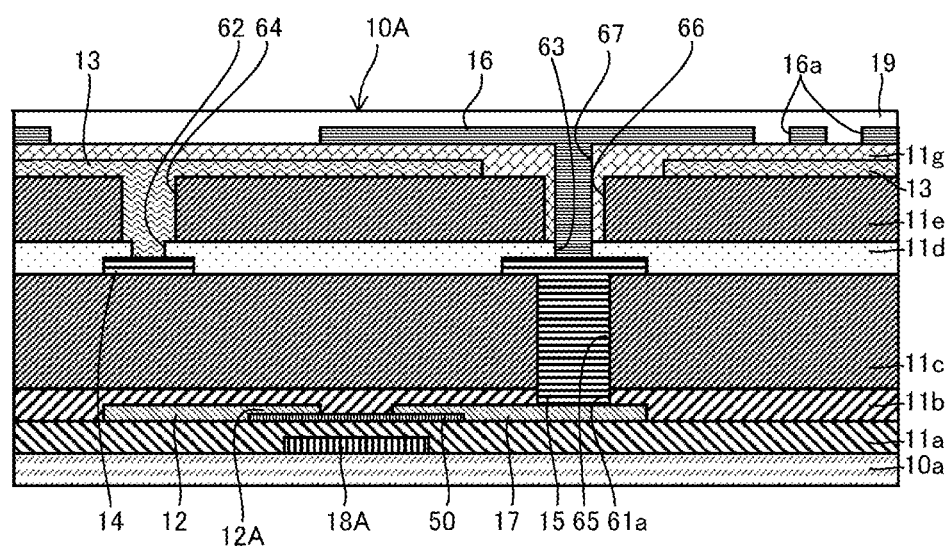
FIG. 3 is a schematic cross-sectional view of the active matrix substrate according to the first embodiment.

FIGS. 2 and 3 are schematic cross-sectional views of an active matrix substrate 10A according to a first embodiment. FIGS. 2 and 3 are both schematic cross-sectional views at a connection position between a pixel electrode 16 and a drain electrode 17 described later. FIG. 2 is a schematic cross-sectional view at a position other than the connection position between a common electrode 13 and a touch sensor line 14 described later, and FIG. 3 is a schematic cross-sectional view at the connection position between the common electrode 13 and the touch sensor line 14. Next, the active matrix substrate 10A according to the first embodiment will be described with reference to FIGS. 2 and 3.

The active matrix substrate 10A according to the first embodiment includes a glass substrate 10a, a gate electrode 18A, a gate insulating layer (protective film) 11a, a semiconductor layer 50, a data line 12 and a source electrode 12A, a drain electrode 17, a data line insulating layer (protective film) 11b, an organic insulating layer 11c, a touch sensor line 14 and a connection electrode 15 (first layer), a touch sensor line insulating layer (protective film) 11d, a first insulating layer 11e, a common electrode 13 (third layer), a second insulating layer 11g, a pixel electrode 16 (second layer), and an alignment film 19, in this order from the side opposite to the liquid crystal layer 30. Note that, in the following description, "upper" refers to an upper direction in FIGS. 2 and 3, and refers to a liquid crystal layer 30 side in the active matrix substrate 10A. Further, "lower" refers to a side opposite to the upper direction in FIGS. 2 and 3, and refers to a glass substrate 10a side in the active matrix substrate 10A. Note that in FIGS. 2 and 3, layers functioning as the data line 12, the source electrode 12A, and the drain electrode 17 are illustrated having flat upper surfaces, but in reality, there are slight level differences in a portion overlapping with the semiconductor layer 50. The same applies to other cross-sectional views. The gate electrode 18A is connected to a gate line 18 (see FIG. 4) described below. The gate line 18 is not illustrated in the cross-sections of FIGS. 2 and 3.

The gate line 18 and the gate electrode 18A are disposed on the glass substrate 10a. The gate line 18 and the gate electrode 18A are formed of a metallic film, for example, copper on which titanium is layered. The gate insulating layer 11a is disposed above the glass substrate 10a so as to cover the gate line 18 and the gate electrode 18A, and functions as a protective film. The gate insulating layer 11a is formed of an inorganic insulating film, for example, silicon nitride (SiNx) or silicon oxide (SiO$_2$).

The data line 12, the source electrode 12A, and the drain electrode 17 are placed on the gate insulating layer 11a. The data line 12, the source electrode 12A, and the drain electrode 17 are formed of a metallic film such as titanium on which copper is layered. The semiconductor layer 50 is disposed on the gate insulating layer 11a.

Figure 4:
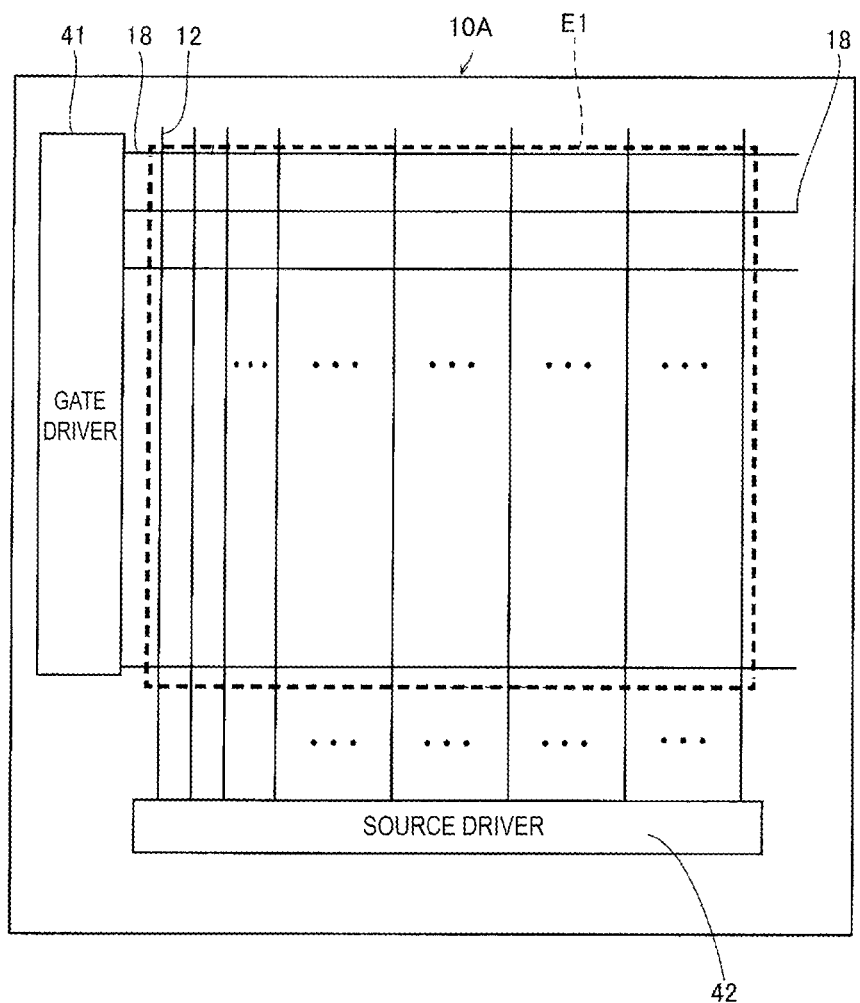
FIG. 4 is a schematic plan view schematically illustrating a configuration of the active matrix substrate according to the first embodiment.

FIG. 4 is a schematic plan view schematically illustrating a configuration of the active matrix substrate 10A. The active matrix substrate 10A includes a gate driver 41 and a source driver 42. A plurality of the gate lines 18 and a plurality of the data lines 12 intersect each other and are disposed in a lattice pattern in plan view. Near the intersection of the gate line 18 and the data line 12, a thin film transistor 51 (not illustrated in FIG. 4. See FIG. 5) is disposed. The thin film transistor 51 includes the semiconductor layer 50, the source electrode 12A, the gate electrode 18A, and the drain electrode 17 described above.

Figure 5:
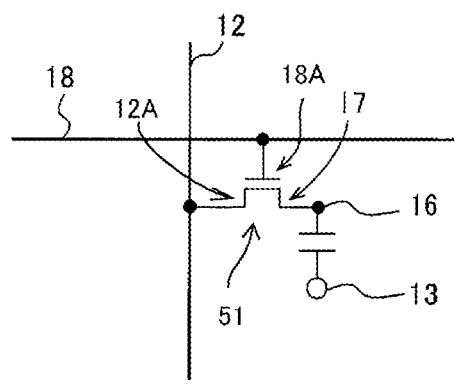
FIG. 5 is a schematic circuit diagram for explaining a connection between a thin film transistor and a gate line as well as a data line in the active matrix substrate.

FIG. 5 is an equivalent circuit diagram for explaining the connection between the thin film transistor 51 and the gate line 18 as well as the data line 12 in the active matrix substrate 10A. The gate electrode 18A of the thin film transistor 51 is connected to the gate line 18. The source electrode 12A is connected to the data line 12. The drain electrode 17 is connected to the pixel electrode 16. The pixel electrode 16 forms capacitance with the common electrode 13.

The plurality of gate lines 18 each connect corresponding thin film transistors 51 of the thin film transistors 51 and the gate driver 41. The plurality of data lines 12 each connect corresponding thin film transistors 51 of the thin film transistors 51 and the source driver 42. The gate driver 41 and the source driver 42 are each disposed in a frame region outside of a display region E1 in which a plurality of the pixel electrodes 16 are disposed.

The gate driver 41 and the source driver 42 are constituted by an integrated circuit, for example. The gate driver 41 supplies a gate signal (scanning signal) sequentially to each of the plurality of gate lines 18. Specifically, the gate driver 41 sequentially applies voltage to (scans) the plurality of gate lines 18, in response to a horizontal synchronization signal from the controller 2. The source driver 42 supplies a data signal (source signal) to each of the plurality of data lines 12.

A data line insulating layer 11b is disposed above the gate insulating layer 11a so as to cover the data line 12, the source electrode 12A, and the drain electrode 17, and functions as a protective film. The data line insulating layer 11b is formed of an inorganic insulating film, for example, silicon nitride or silicon oxide. The data line insulating layer 11b includes an opening 61a above the drain electrode 17. The opening 61a does not overlap the opening 22a of the black matrix 22 in plan view.

The organic insulating layer 11c is disposed above the data line insulating layer 11b. The organic insulating layer 11c is formed of, for example, a photosensitive acrylic resin. The organic insulating layer 11c includes, above the drain electrode 17, an opening 65 at least partially overlapping the opening 61a in plan view.

The touch sensor line 14 is disposed above part of the organic insulating layer 11c. The touch sensor line 14 is disposed parallel with the data line 12. The touch sensor line 14 is formed of, for example, a transparent conductive film (indium tin oxide (ITO), for example) above which copper is layered.

The connection electrode 15 is disposed above part of the organic insulating layer 11c, in the opening 61a of the data line insulating layer 11b, and in the opening 65 of the organic insulating layer 11c. As a result of being disposed in the opening 61a and the opening 65, the connection electrode 15 is connected to the drain electrode 17 via the opening 61a and the opening 65. A portion of the connection electrode 15 disposed above part of the organic insulating layer 11c is included in the same layer as the touch sensor line 14. The connection electrode 15 is formed of the same material as the touch sensor line 14.

The touch sensor line insulating layer 11d is disposed above the organic insulating layer 11c so as to cover the touch sensor line 14 and a portion of the connection electrode 15 disposed above part of the organic insulating layer 11c, and functions as a protective film. The touch sensor line insulating layer 11d is formed of an inorganic insulating film, for example, silicon nitride or silicon oxide.

The touch sensor line insulating layer 11d includes an opening 62 above the touch sensor line 14 (see FIG. 3). The touch sensor line insulating layer 11d includes an opening 63 above part of the connection electrode 15 included in the same layer as the touch sensor line 14.

The first insulating layer 11e is disposed above the touch sensor line insulating layer 11d. The first insulating layer 11e is formed of an organic resin film, for example, a photosensitive acrylic resin. As illustrated in FIG. 3, the first insulating layer 11e includes an opening 64 (first opening) and an opening 66 (first opening). The opening 64 and the opening 66 are separated from each other in plan view. At least part of the opening 64 overlaps the opening 62 in plan view above the touch sensor line 14. In the example of FIGS. 2 and 3, the opening 64 includes a whole of the opening 62 in plan view above the touch sensor line 14. At least part of the opening 66 overlaps the opening 63 in plan view above part of the connection electrode 15 included in the same layer as the touch sensor line 14. In the example of FIGS. 2 and 3, the opening 66 includes a whole of the opening 63 in plan view above part of the connection electrode 15 included in the same layer as the touch sensor line 14.

The common electrode 13 is disposed above part of the first insulating layer 11e, in the opening 64 of the first insulating layer 11e, and in the opening 62 of the touch sensor line insulating layer 11d. The common electrode 13 is formed of, for example, a transparent conductive film (ITO, for example).

Figure 6:
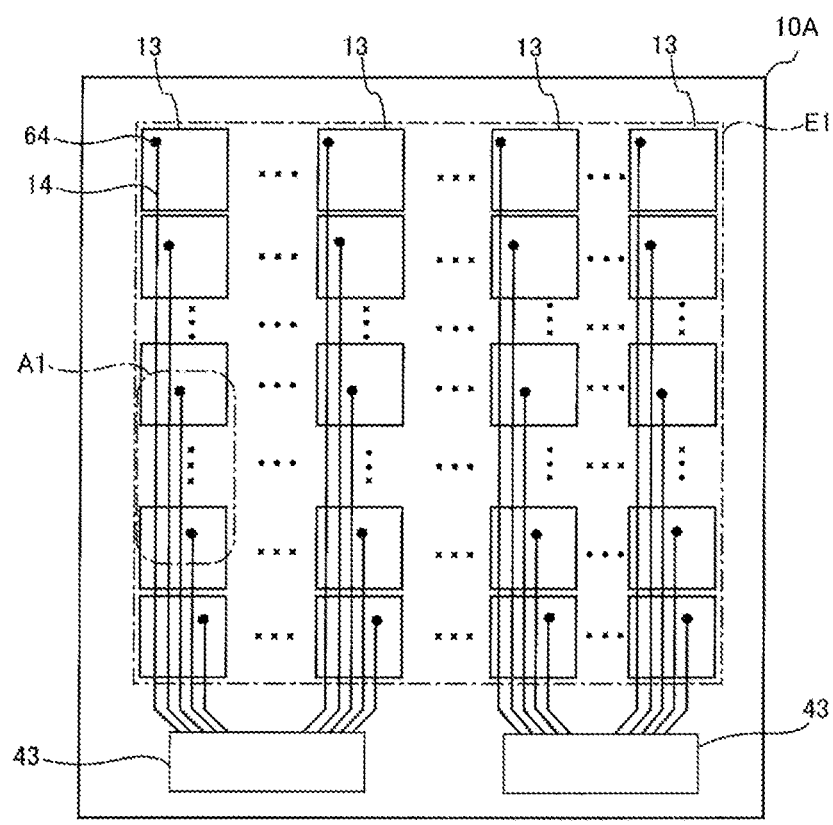
FIG. 6 is a schematic plan view schematically illustrating the configuration of the active matrix substrate.

As a result of the common electrode 13 being disposed in the opening 64 and the opening 62 (second contact hole), the common electrode 13 and the touch sensor line 14 are connected via the opening 64 and the opening 62. FIG. 6 is a schematic plan view schematically illustrating a configuration of the active matrix substrate 10A. FIG. 6 is a schematic plan view of a layer including the common electrode 13 and the touch sensor line 14. The touch sensor line 14 is connected to one common electrode 13 of a plurality of the common electrodes 13, and is not connected to the other common electrodes 13.

The second insulating layer 11g is disposed above the first insulating layer 11e so as to cover the common electrode 13. The second insulating layer 11g is disposed in the opening 66. A portion of the second insulating layer 11g disposed in the opening 66 includes an opening 67. The second insulating layer 11g is formed of an inorganic insulating film, for example, silicon nitride.

The pixel electrode 16 is disposed above the second insulating layer 11g, and is disposed in the opening 67 and the opening 63 (first contact hole). The pixel electrode 16 is formed of, for example, a transparent conductive film (ITO, for example). As a result of the pixel electrode 16 being disposed in the opening 67 and the opening 63, the pixel electrode 16 and the connection electrode 15 are connected via the opening 67 and the opening 63. As a result of the connection electrode 15 being connected to the drain electrode 17, the drain electrode 17 and the pixel electrode 16 are connected via the connection electrode 15. Therefore, the connection electrode 15 has a function of electrically connecting the drain electrode 17 and the pixel electrode 16.

The first insulating layer 11e includes an upward protruding portion 11f (FIG. 2). The protruding portion 11f is located above the touch sensor line 14. Part of the common electrode 13, the second insulating layer 11g, and part of the pixel electrode 16 are sequentially disposed on the protruding portion 11f. Therefore, the active matrix substrate 10A has an upward protruding shape above the protruding portion 11f. Thus, a cell gap is secured when the touch surface is pressed. That is, the protruding portion 11f functions as a bump.

An electrical field is generated between the pixel electrode 16 and the common electrode 13, thereby driving the liquid crystal molecules contained in the liquid crystal layer 30. A plurality of slits 16a are provided in the pixel electrode 16, and the liquid crystal molecules are driven by a transverse electrical field driving method. The common electrode 13 is provided common to the plurality of pixel electrodes 16. The common electrode 13 functions not only as a counter electrode of the pixel electrode 16, and also functions as a touch sensor electrode by being connected to the touch sensor line 14.

The active matrix substrate 10A includes a touch detection driver 43 (FIG. 6). The touch detection driver 43 is constituted by an integrated circuit, for example. The touch detection driver 43 and the common electrodes 13 are connected via corresponding touch sensor lines 14 of the touch sensor line 14. The touch detection driver 43 transmits a drive signal to each of the common electrodes 13 and receives a signal from each of the common electrodes 13. Then, the touch detection driver 43 detects a touch position by a pointer (a finger, for example) in response to the received signal.

Method of Manufacturing Active Matrix Substrate

Figure 7:
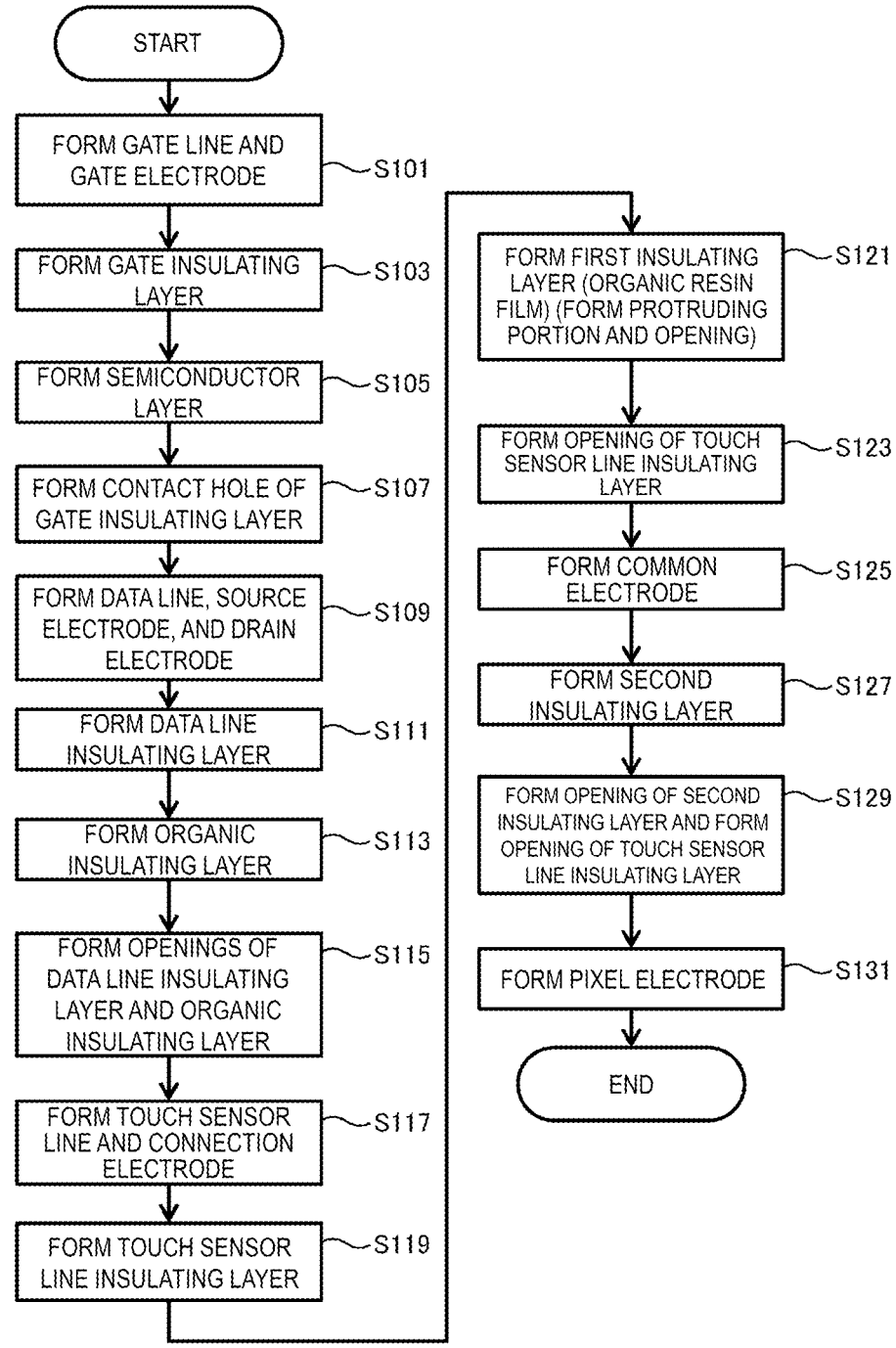
FIG. 7 is a flowchart illustrating an example of a flow of a method of manufacturing the active matrix substrate according to the first embodiment.

FIG. 7 is a flowchart illustrating an example of a flow of a method of manufacturing the active matrix substrate 10A according to the first embodiment. First, the gate line 18 and the gate electrode 18A are formed, on the glass substrate 10a, of, for example, a metallic film of titanium above which copper is layered (step S101). The gate insulating layer 11a is formed of an inorganic insulating film so as to cover the gate line 18 and gate electrode 18A that are formed (step S103). Above the formed gate insulating layer 11a, the semiconductor layer 50 is formed of an oxide semiconductor single layer (step S105). The gate insulating layer 11a is provided with a contact hole (not illustrated in any of the cross-sectional views) for connecting a layer formed of the same film as the gate line and a layer formed of the same film as the data line (step S107).

Above the formed semiconductor layer 50, the data line 12, the source electrode 12A, and the drain electrode 17 are formed of, for example, a metallic film such as titanium above which copper is layered (step S109). Note that although being formed of the same material at the same time, the data line 12, the source electrode 12A, and the drain electrode 17 may be formed of different materials in a plurality of steps.

The data line insulating layer 11b is formed of an inorganic insulating film so as to cover the source electrode 12A, the drain electrode 17, and the data line 12 connected to the source electrode 12A (step S111). The organic insulating layer 11c is formed above the formed data line insulating layer 11b. (step S113). The opening 61a is formed in a portion above the drain electrode 17 of the formed data line insulating layer 11b. At the position of a portion which is above the drain electrode 17 of the formed organic insulating layer 11c and at least partially overlaps the opening 61a in plan view, the opening 65 is formed (step S115).

Above part of the formed organic insulating layer 11c, the touch sensor line 14 and the connection electrode 15 are formed of a transparent conductive film (for example, ITO) above which copper is layered (step S117). In step S117, the connection electrode 15 is formed also in the opening 65 and the opening 61a of the data line insulating layer 11b. Thus, the connection electrode 15 is connected to the drain electrode 17.

Above the formed organic insulating layer 11c, the touch sensor line insulating layer 11d is formed of an inorganic insulating film of silicon nitride, silicon oxide, or the like, for example, so as to cover the formed touch sensor line 14 and a portion formed above the organic insulating layer 11c of the formed connection electrode 15 (step S119).

Above the formed touch sensor line insulating layer 11d, the first insulating layer 11e is formed of a photosensitive organic resin film (step S121). In step S121, the organic resin film is exposed to light using a multi-tone mask. The multi-tone mask is formed such that an exposure level differs among the openings 64 and 66 (first opening), the protruding portion 11f, and the other portions. The multi-tone mask is a mask that allows intermediate exposure and is, for example, a half-tone mask.

The multi-tone mask allows three exposure levels of an exposed portion, an intermediate (half) exposed portion, and an unexposed portion (mask black portion) in a single exposure. In step S121, the organic resin film is exposed to light using a multi-tone mask including an exposed portion for the openings 64 and 66 (first opening), an unexposed portion for the protruding portion 11f, and intermediate exposed portions for the other portions. As a result, in step S121, the openings 64 and 66 of the first insulating layer 11e, the protruding portion 11f, and the other portions are formed in one processing.

The opening 62 is formed in the position of a portion that is above the touch sensor line 14 of the formed touch sensor line insulating layer 11d and at least partially overlaps, in plan view, the opening 64 formed in the first insulating layer 11e (step S123).

The common electrode 13 is formed of a transparent conductive film such as ITO, for example, in a layer above part of the formed first insulating layer 11e, the opening 64 formed in the first insulating layer 11e, and the opening 62 formed in the touch sensor line insulating layer 11d (step S125). Thus, the common electrode 13 is connected to the touch sensor line 14 via the opening 64 and the opening 62. The common electrode 13 and a portion not connected to the common electrode 13 of the touch sensor line 14 are insulated from each other.

Above the formed first insulating layer 11e, the second insulating layer 11g is formed of an inorganic insulating film of silicon nitride, silicon oxide, or the like so as to cover the portion formed above the first insulating layer 11e of the common electrode 13 (step S127). The opening 67 is formed in a portion that is above the connection electrode 15 of the formed second insulating layer 11g and is included in the opening 66 in plan view. The opening 63 is formed in the position of a portion that is above the connection electrode 15 of the touch sensor line insulating layer 11d and at least partially overlaps the opening 67 in plan view (step S129).

The pixel electrode 16 is formed of a transparent conductive film such as ITO, for example, above the formed second insulating layer 11g, in the opening 67 formed in the second insulating layer 11g, and the opening 63 formed in the touch sensor line insulating layer 11d (step S131). As a result, the pixel electrode 16 is connected to the connection electrode 15 via the opening 67 and the opening 63. The connection electrode 15 is connected to the drain electrode 17, and thus, the pixel electrode 16 is connected to the drain electrode 17 via the connection electrode 15. That is, the connection electrode 15 connecting the drain electrode 17 and the pixel electrode 16 is formed.

Thus, the active matrix substrate 10A is manufactured. Subsequently, the active matrix substrate 10A, the counter substrate 20, and the liquid crystal layer 30 are combined to complete the display panel 1.

Effects of First Embodiment

Figure 8:
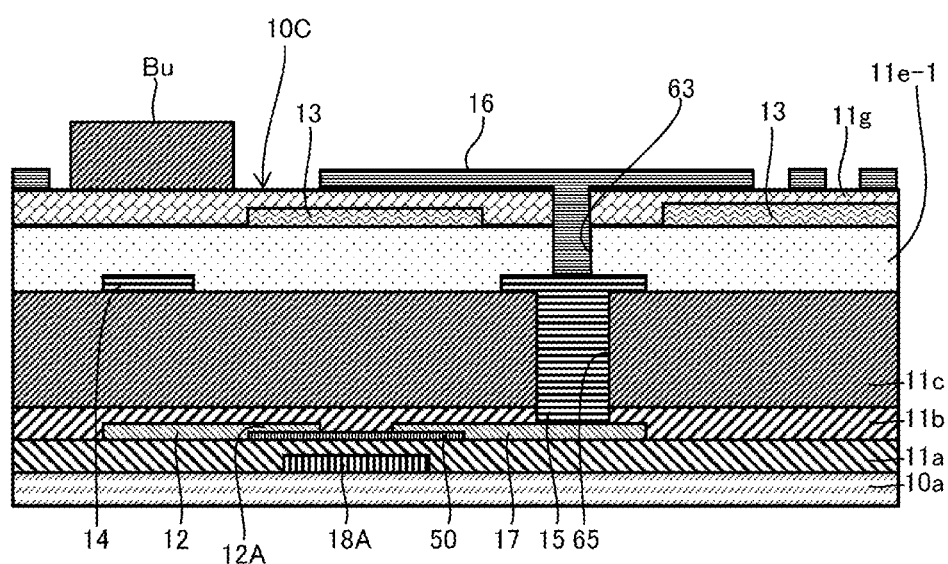
FIG. 8 is a schematic cross-sectional view of an active matrix substrate according to a comparative example.
Figure 9:
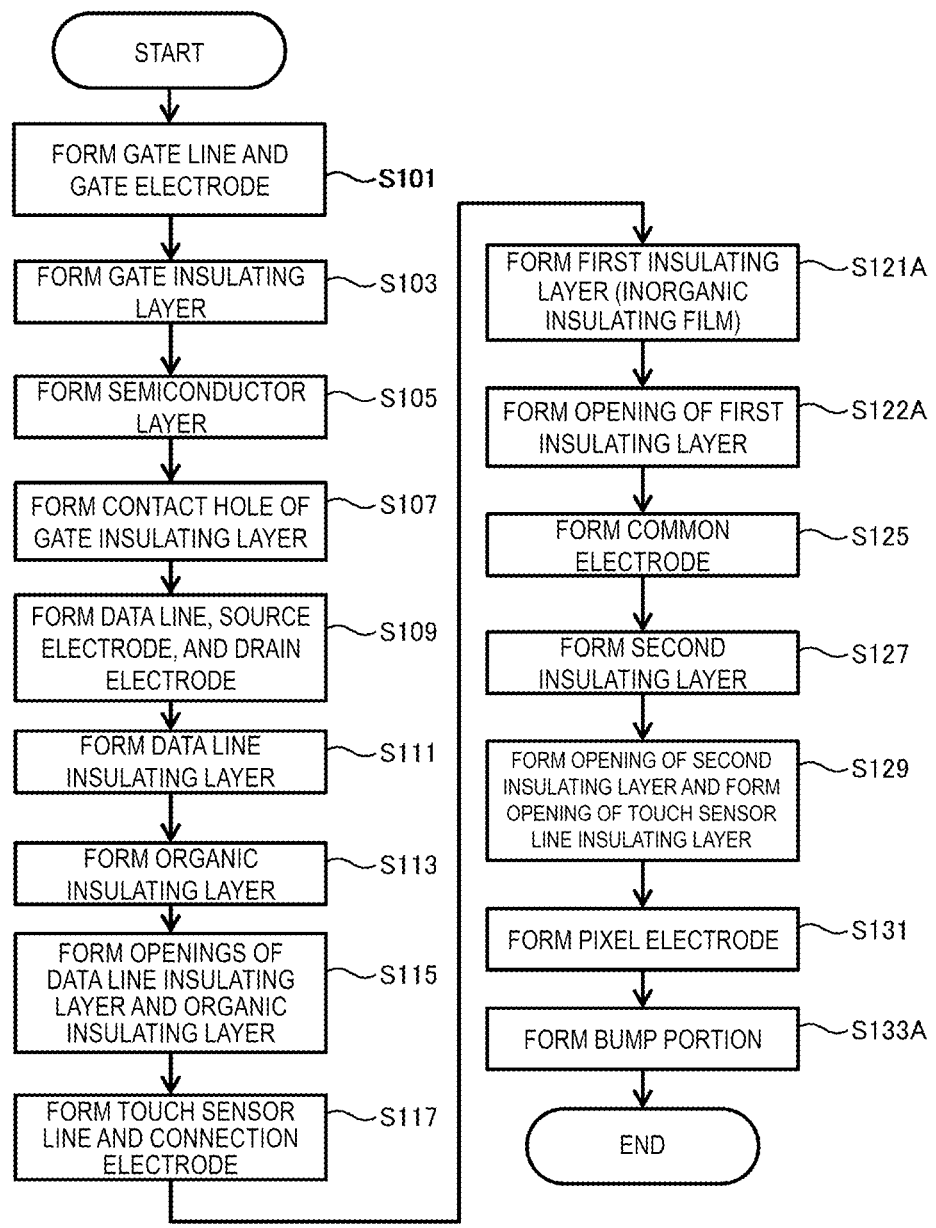
FIG. 9 is a flowchart illustrating an example of a flow of a method of manufacturing the active matrix substrate according to the comparative example.

Effects of the active matrix substrate 10A and the method of manufacturing the active matrix substrate 10A according to the first embodiment will be described in comparison with an active matrix substrate and a method of manufacturing the active matrix substrate according to a comparative example. FIG. 8 is a schematic cross-sectional view of an active matrix substrate 10C according to the comparative example. FIG. 9 is a flowchart illustrating an example of a flow of the method of manufacturing the active matrix substrate 10C according to the comparative example.

The active matrix substrate 10C according to the comparative example (FIG. 8) includes a first insulating layer 11e-1 above the organic insulating layer 11c instead of the touch sensor line insulating layer 11d and the first insulating layer 11e of the active matrix substrate 10A according to the first embodiment. The first insulating layer 11e-1 is formed of an inorganic insulating film, for example, silicon nitride or silicon oxide.

On the other hand, in the active matrix substrate 10A according to the first embodiment, the first insulating layer 11e made of an organic resin film is disposed between the common electrode 13 (third layer) and the touch sensor line 14 (first layer). The organic resin film has a lower dielectric constant than an insulating layer made of an inorganic material. It is possible to form the organic resin film, which has photosensitivity, by coating. In addition, it is possible to easily form the organic resin film as a thick film as compared with an inorganic material deposited by chemical vapor deposition (CVD). Therefore, it is possible to reduce parasitic capacitance between the common electrode 13 and the touch sensor line 14 as compared with parasitic capacitance between the common electrode 13 and the touch sensor line 14 in the active matrix substrate 10C according to the comparative example. Thus, load capacitance between the common electrode 13 and the touch sensor line 14 is reduced. As a result, the display panel 1 mounted with the active matrix substrate 10A can have improved touch performance. In the display panel 1, it is possible to reduce unevenness in sensing.

In the active matrix substrate 10C according to the comparative example, a bump portion Bu is formed separately from the second insulating layer 11g (FIG. 8). On the other hand, in the active matrix substrate 10A according to the first embodiment, the first insulating layer 11e includes the protruding portion 11f having a bump function. That is, in the active matrix substrate 10A according to the first embodiment, part of the first insulating layer 11e exhibits the bump function.

Therefore, in the active matrix substrate 10A according to the first embodiment, unlike the configuration where the bump portion is separately disposed as in the active matrix substrate 10C according to the comparative example, there is no connection portion between the upper layer of the active matrix substrate and the portion having the bump function. As a result, as compared with a case where the bump portion is separately disposed, it is possible to increase a strength of a portion having a bump function in directions other than a vertical direction. Therefore, it is possible to improve the quality of the display panel 1 mounted with the active matrix substrate 10A. As a result of the protruding portion 11f being formed above the touch sensor line 14, compared with a case where the bump portion Bu is separately formed or a case where the bump portion Bu is not provided, it is possible to increase a distance between the touch sensor line 14 and the common electrode 13. Therefore, it is possible to decrease the load capacitance between the touch sensor line 14 and the common electrode 13.

The method of manufacturing the active matrix substrate 10C according to the comparative example (FIG. 9) is different from the method of manufacturing the active matrix substrate 10A according to the first embodiment (FIG. 7) in that step S119 is not included. Other differences are inclusion of steps S121A and S122A instead of step S121 and further inclusion of step S133A.

More particularly, in the method of manufacturing the active matrix substrate 10C according to the comparative example, above the organic insulating layer 11c formed in step S113, the first insulating layer 11e-1 is formed of an inorganic insulating film of silicon nitride or silicon oxide, for example, so as to cover at least part of the touch sensor line 14 and at least part of the connection electrode 15, the touch sensor line 14 and the connection electrode 15 having been formed in step S117 (step S121A). An opening (not illustrated) is formed in a portion above the touch sensor line 14 of the formed first insulating layer 11e-1 (step S122A).

In the method of manufacturing the active matrix substrate 10C according to the comparative example, after the pixel electrode 16 is formed in step S131, the bump portion Bu is formed of, for example, an organic resin film, above the second insulating layer 11g formed in step S127 (step S133A).

According to the method of manufacturing the active matrix substrate 10A according to the first embodiment, the openings 64 and 66 are formed collectively in forming the first insulating layer 11e in step S121. Therefore, in the method of manufacturing the active matrix substrate 10A according to the first embodiment, it is possible to simplify the process as compared with the manufacturing method according to the comparative example. Thus, by using the active matrix substrate 10A according to the first embodiment, high functionality and cost reduction of the display panel 1 are achieved.

According to the method of manufacturing the active matrix substrate 10A of the first embodiment, the protruding portion 11f is formed in the same step as the formation of the first insulating layer 11e. Therefore, in the method of manufacturing the active matrix substrate 10A according to the first embodiment, it is possible to simplify the process as compared with the manufacturing method according to the comparative example. Thus, by using the active matrix substrate 10A according to the first embodiment, high functionality and cost reduction of the display panel 1 are achieved.

According to the method of manufacturing the active matrix substrate 10A of the first embodiment, the first insulating layer 11e is formed of an organic resin film, and thus, if the parasitic capacitance between the common electrode 13 and the touch sensor line 14 is set to the same level as that of a case where the first insulating layer is formed of an inorganic film by CVD, the thickness of the first insulating layer 11e formed of an organic resin film can be smaller than that of the first insulating layer formed of an inorganic film by CVD. When the first insulating layer 11e is formed of an organic resin film, it is possible to easily form the protruding portion 11f and, at the same time, the bump portion can be formed. Therefore, it is possible to reduce a processing time and cost.

Second Embodiment

Figure 10:
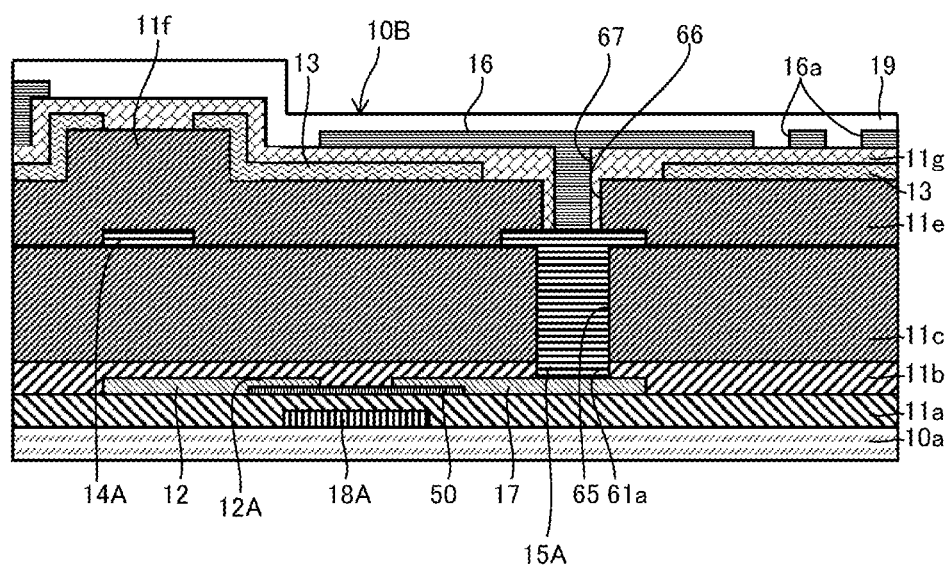
FIG. 10 is a schematic cross-sectional view of an active matrix substrate according to a second embodiment.
Figure 11:
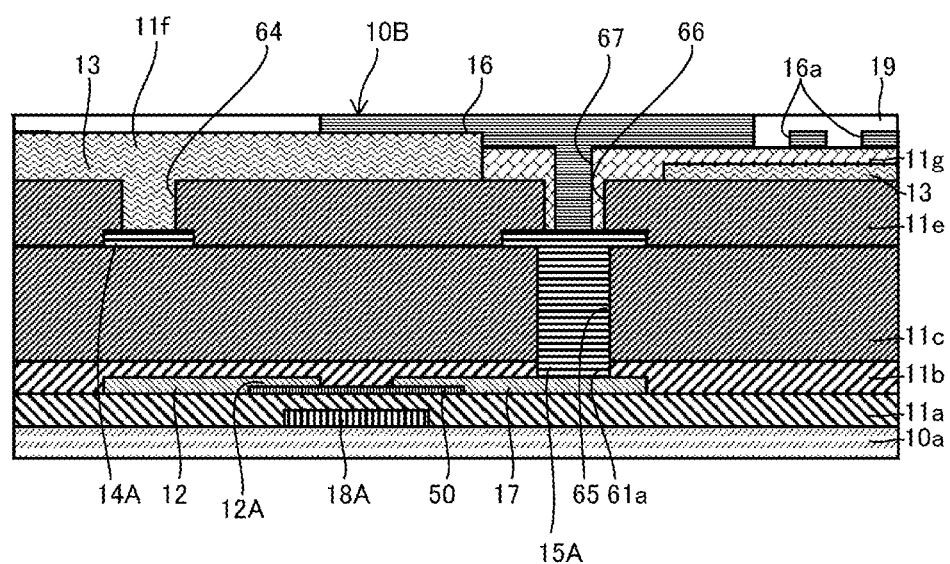
FIG. 11 is a schematic cross-sectional view of the active matrix substrate according to the second embodiment.

FIGS. 10 and 11 are schematic cross-sectional views of an active matrix substrate 10B according to a second embodiment. A configuration of the active matrix substrate 10B according to the second embodiment includes a touch sensor line 14A and a connection electrode 15A instead of the touch sensor line 14 and the connection electrode 15 of the active matrix substrate 10A according to the first embodiment. The active matrix substrate 10B according to the second embodiment has the configuration illustrated in FIGS. 4 to 6 similarly to the active matrix substrate 10A.

As in the active matrix substrate 10A, the touch sensor line 14A and the connection electrode 15A are disposed above part of the organic insulating layer 11c. While the touch sensor line 14 and the connection electrode 15 are formed of a transparent conductive film on which copper is layered, the touch sensor line 14A and the connection electrode 15A are formed of a layered film of titanium (Ti), aluminum (Al), and titanium (Ti).

In the active matrix substrate 10A according to the first embodiment, the touch sensor line 14 and the connection electrode 15 are formed of a transparent conductive film above which copper is layered. In such a case, in the active matrix substrate 10A according to the first embodiment, the touch sensor line insulating layer 11d formed of an inorganic insulating film is disposed so as to cover the touch sensor line 14 and the connection electrode 15, and thus, the copper around the outer peripheries of the touch sensor line 14 and the connection electrode 15 is prevented from being oxidized by moisture contained in the organic resin film.

On the other hand, in the active matrix substrate 10B, the touch sensor line 14A and the connection electrode 15A are formed of a layered film of titanium, aluminum, and titanium. In such a case, the titanium around the outer peripheries of the touch sensor line 14A and the connection electrode 15A results in turning into titanium oxide, which prevents further oxidization, and thus, the inside is prevented from being oxidized by moisture contained in the organic resin film. Therefore, in the active matrix substrate 10B according to the second embodiment, it is possible to eliminate the touch sensor line insulating layer 11d. As a result, in the active matrix substrate 10B, above the organic insulating layer 11c, the first insulating layer 11e is disposed in contact with the touch sensor line 14A and the connection electrode 15A so as to cover the touch sensor line 14A and the connection electrode 15A. Note that a material of the touch sensor line 14A and the connection electrode 15A is not limited to a layered film of titanium, aluminum, and titanium, and the outer peripheries thereof need to be formed of a material that prevents the inside from being oxidized by moisture contained in the organic resin film.

With such a configuration, in the method of manufacturing the active matrix substrate 10B according to the second embodiment, it is possible to eliminate the step of forming the touch sensor line insulating layer 11d (step S119) and the step of forming the openings 62 and 63 in the touch sensor line insulating layer 11d (step S123).

Thus, it is possible to further reduce the manufacturing cost of the active matrix substrate 10B, and at the same time, it is possible to further simplify the manufacturing method. Therefore, by using the active matrix substrate 10B according to the second embodiment, it is possible to further achieve high functionality and cost reduction of the display panel 1.

MODIFIED EXAMPLES

Note that in the example described above, the first insulating layer 11e includes the protruding portion 11f functioning as a bump. In such a case, by using a multi-tone mask such as a half-tone mask, the openings 64 and 66 of the first insulating layer 11e, the protruding portion 11f, and the other portions are formed in a single step.

However, it is not essential that the first insulating layer 11e includes the protruding portion 11f. In a modified example, the first insulating layer 11e need not include the protruding portion 11f. For example, like the active matrix substrate 10C according to the comparative example, the active matrix substrate may be manufactured by a manufacturing method including a step of forming the bump portion Bu above the second insulating layer 11g, separately from the step of forming the first insulating layer 11e.

Also in such a case, as in the example described above, it is possible to form the openings 64 and 66 in the same step as the step of forming the first insulating layer 11e. Accordingly, it is possible to simplify the process as compared with the manufacturing method including a step of forming the openings 64 and 66 separately from the step of forming the first insulating layer 11e. In addition, it is possible to reduce the parasitic capacitance between the common electrode 13 and the touch sensor line 14 without increasing a thickness of the first insulating layer or performing dry etching as in a case where the first insulating layer 11e is formed of an inorganic film by CVD.

Note that the disclosure is not limited to the above-mentioned embodiments, and it is possible to make various changes. It is possible to express the active matrix substrate, the display panel with a touch sensor function, and the method of manufacturing an active matrix substrate, according to the embodiments as follows:

(1) An active matrix substrate according to an embodiment is an active matrix substrate to be mounted on a display panel with a touch sensor function. The active matrix substrate includes a first layer provided with a touch sensor line; a second layer above the touch sensor line, the second layer being provided with a pixel electrode; a third layer between the first layer and the second layer, the third layer being provided with a common electrode functioning as a counter electrode of the pixel electrode and functioning as a touch sensor electrode by being connected to the touch sensor line; a first insulating layer formed between the first layer and the third layer; and a second insulating layer formed between the second layer and the third layer. The first insulating layer is formed of an organic resin film.

With such a configuration, in the active matrix substrate according to an embodiment, the first insulating layer formed of an organic resin film is disposed between the third layer and the first layer. The organic resin film has a lower dielectric constant than a film formed of an inorganic material, and thus, as compared with a case where the insulating layer formed of an inorganic material is provided, it is possible to decrease the parasitic capacitance between the common electrode and the touch sensor line. Thus, in the active matrix substrate according to an embodiment, it is possible to reduce the load capacitance between the common electrode and the touch sensor line. As a result, in the display panel with a touch sensor function using the active matrix substrate, it is possible to improve touch performance. In the display panel with a touch sensor function using the active matrix substrate, it is also possible to reduce unevenness in sensing.

(2) In the active matrix substrate according to (1), the first insulating layer is preferably disposed above the first layer with the first insulating layer being in contact with the touch sensor line and covering the touch sensor line. With such a configuration, the first insulating layer functions as a protective film of the touch sensor line, and it is possible to eliminate a separate protective film. In such a manner, it is possible to achieve cost reduction of the active matrix substrate.

(3) In the active matrix substrate according to (1) or (2), preferably, the first layer is further provided with a connection electrode connected to a drain electrode of a thin film transistor, the first insulating layer and the second insulating layer include a first contact hole above the connection electrode, and part of the pixel electrode is disposed in the first contact hole. As a result, it is possible to achieve connection between the pixel electrode and the drain electrode.

(4) In the active matrix substrate according to any one of (1) to (3), preferably, the first insulating layer and the second insulating layer include a second contact hole above the touch sensor line, and part of the common electrode is disposed in the second contact hole. As a result, it is possible to achieve connection between the common electrode and the touch sensor line.

(5) In the active matrix substrate according to any one of (1) to (4), the first insulating layer preferably includes an upward protruding portion. The protruding portion has a bump function in the display panel with a touch sensor function mounted with the active matrix substrate. When the first insulating layer includes the protruding portion having the bump function, part of the first insulating layer exhibits the bump function. Therefore, unlike in a case where the bump portion is separately disposed, there is no connection portion between an upper layer of the active matrix substrate and a portion having the bump function. As a result, as compared with a case where the bump portion is separately disposed, it is possible to increase a strength of a portion having a bump function in directions other than a vertical direction. Therefore, it is possible to improve quality of the display panel with a touch sensor function mounted with the active matrix substrate.

(6) In the active matrix substrate according to (5), the protruding portion is preferably disposed above the touch sensor line. Thus, it is possible to increase a distance between the touch sensor line and the common electrode. Thus, it is possible to decrease the load capacitance between the touch sensor line and the common electrode.

(7) A display panel with a touch sensor function, according to an embodiment, includes the active matrix substrate according to any one of (1) to (4), a liquid crystal layer above the active matrix substrate, and a counter substrate disposed over the active matrix substrate with the liquid crystal layer interposed therebetween.

When the display panel with a touch sensor function includes the active matrix substrate having the above-described characteristics, the first insulating layer formed of an organic resin film is disposed between the third layer and the first layer. Accordingly, in the display panel with a touch sensor function, the load capacitance between the common electrode and the touch sensor line is reduced. As a result, in the display panel with a touch sensor function, it is possible to improve touch performance. In the display panel with a touch sensor function, it is possible to reduce unevenness in sensing.

(8) A method of manufacturing an active matrix substrate according to an embodiment is a method of manufacturing an active matrix substrate to be mounted on a display panel with a touch sensor function. The method includes forming a touch sensor line; forming a first insulating layer covering at least part of the touch sensor line; forming a common electrode above the first insulating layer; and forming a second insulating layer covering at least part of the common electrode. In the method, the forming a first insulating layer includes forming a first opening, the forming a second insulating layer includes forming a second opening at a position at least partially overlapping with the first opening in plan view, the method further includes forming a pixel electrode above the second insulating layer, in the first opening, and in the second opening, and the forming a first insulating layer includes forming an organic resin film.

In the active matrix substrate manufactured by such a manufacturing method, the first insulating layer formed of an organic resin film is disposed between a third layer and a first layer. Thus, in the active matrix substrate manufactured by the method of manufacturing an active matrix substrate according to an embodiment, the load capacitance between the common electrode and the touch sensor line is reduced. As a result, in the display panel with a touch sensor function using the active matrix substrate, it is possible to improve touch performance. In the display panel with a touch sensor function using the active matrix substrate, it is also possible to reduce unevenness in sensing.

(9) In the method of manufacturing an active matrix substrate, according to (8), the forming of a first insulating layer preferably includes forming the organic resin film being in contact with the touch sensor line and covering the touch sensor line. Thus, it is possible to eliminate forming a touch sensor line insulating layer formed of an inorganic insulating film. Thus, by using the active matrix substrate manufactured by the manufacturing method, it is possible to achieve high functionality and cost reduction of the display panel with a touch sensor function.

(10) In the method of manufacturing an active matrix substrate, according to (8) or (9), the forming a first insulating layer preferably further includes forming a protruding portion on an upper layer side. The protruding portion has a bump function in the display panel with a touch sensor function mounted with the active matrix substrate. According to the manufacturing method, the protruding portion is formed in the same step as the forming a first insulating layer. Therefore, in the manufacturing method, it is possible to simplify the process as compared with a manufacturing method in which the bump portion is formed separately from the first insulating layer. Thus, by using the active matrix substrate manufactured by the manufacturing method, it is possible to achieve high functionality and cost reduction of the display panel with a touch sensor function.

(11) In the method of manufacturing an active matrix substrate, according to (10), the forming a first insulating layer preferably includes exposing the organic resin film to light, by using a multi-tone mask formed having exposure levels different among the first opening, the protruding portion, and the other portion. Accordingly, in the forming a first insulating layer, the first opening, the protruding portion, and the other portion are formed at the same time in the same step.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An active matrix substrate to be mounted on a display panel with a touch sensor function, the active matrix substrate comprising:
a first layer provided with a touch sensor line;
a second layer above the touch sensor line, the second layer being provided with a pixel electrode;
a third layer between the first layer and the second layer, the third layer being provided with a common electrode functioning as a counter electrode of the pixel electrode and functioning as a touch sensor electrode by being connected to the touch sensor line;
a first insulating layer formed between the first layer and the third layer; and
a second insulating layer formed between the second layer and the third layer,
wherein the first insulating layer is formed of an organic resin film,
the first insulating layer includes an upward protruding portion,
the upward protruding portion is disposed above the touch sensor line,
an opening of the third layer is formed on a top surface of the upward protruding portion, and
the second insulating layer contacts with the upward protruding portion of the first insulating layer through the opening.

2. The active matrix substrate according to claim 1, wherein the first insulating layer is disposed above the first layer with the first insulating layer being in contact with the touch sensor line and covering the touch sensor line.

3. The active matrix substrate according to claim 1, wherein the first layer is further provided with a connection electrode connected to a drain electrode of a thin film transistor,
the first insulating layer and the second insulating layer include a first contact hole above the connection electrode, and
a part of the pixel electrode is disposed in the first contact hole.

4. The active matrix substrate according to claim 3, wherein the first insulating layer and the second insulating layer further include a second contact hole above the touch sensor line, and
a part of the common electrode is disposed in the second contact hole.

5. A display panel with a touch sensor function, comprising:
the active matrix substrate according to claim 1;
a liquid crystal layer above the active matrix substrate; and
a counter substrate disposed over the active matrix substrate with the liquid crystal layer interposed therebetween.

6. A method of manufacturing an active matrix substrate to be mounted on a display panel with a touch sensor function, the method comprising:
forming a touch sensor line;
forming a first insulating layer covering at least a part of the touch sensor line;
forming a common electrode above the first insulating layer; and
forming a second insulating layer covering at least a part of the common electrode,
wherein forming the first insulating layer includes forming a first opening,
forming the second insulating layer includes forming a second opening at a position at least partially overlapping with the first opening in a plan view,
the method further includes:
forming a pixel electrode, above the second insulating layer, in the first opening and in the second opening; and
forming the first insulating layer further includes forming an organic resin film, wherein
the first insulating layer includes an upward protruding portion,
the upward protruding portion is disposed above the touch sensor line,
an opening of the third layer is formed on a top surface of the upward protruding portion, and
the second insulating layer contacts with the upward protruding portion of the first insulating layer through the opening.

7. The method according to claim 6,
wherein forming the first insulating layer includes forming the first insulating layer, such that the organic resin film is in contact with the touch sensor line and covers the touch sensor line.

8. The method according to claim 6,
wherein forming the first insulating layer further includes forming the first insulating layer, such that to expose the organic resin film to light by using a multi-tone mask formed having different exposure levels among the first opening, the upward protruding portion, and portions other than the first opening and the upward protruding portion.

* * * * *